United States Patent
Getman et al.

(10) Patent No.: US 7,686,343 B2
(45) Date of Patent: Mar. 30, 2010

(54) DRILL PIPE WITH TOOL JOINTS

(75) Inventors: Aleksandr Vladimirovich Getman, Ekaterinburg (RU); Svetlana Semyonovna Stepanova, Moscow (RU); Yuriy Alekseevich Trifonov, Ekaterinburg (RU)

(73) Assignee: ZAO "Kompaniya "Temerso"", Ekaterinburg (RU)

( * ) Notice: Subject to any disclaimer, the term of this patent is extended or adjusted under 35 U.S.C. 154(b) by 0 days.

(21) Appl. No.: 12/211,415

(22) Filed: Sep. 16, 2008

(65) Prior Publication Data
US 2009/0021008 A1 Jan. 22, 2009

Related U.S. Application Data

(63) Continuation of application No. PCT/IB2008/001923, filed on Jul. 14, 2008.

(30) Foreign Application Priority Data
Jul. 19, 2007 (RU) .............................. 2007127484

(51) Int. Cl.
*F16L 11/12* (2006.01)
(52) U.S. Cl. ........................ 285/45; 166/242.2; 285/333
(58) Field of Classification Search .................... 285/45, 285/47, 333; 166/242.2, 242.4
See application file for complete search history.

(56) References Cited

U.S. PATENT DOCUMENTS

| | | | | |
|---|---|---|---|---|
| 3,361,448 A * | 1/1968 | Warrington | .................. | 285/55 |
| 4,757,595 A * | 7/1988 | Fraering, Jr. | .................. | 29/447 |
| 5,358,285 A * | 10/1994 | Wilson | ........................ | 285/114 |
| 5,360,239 A * | 11/1994 | Klementich | .................... | 285/94 |
| 5,749,605 A * | 5/1998 | Hampton et al. | .............. | 285/48 |
| 6,176,524 B1 * | 1/2001 | Tsuru et al. | .................... | 285/55 |
| 6,933,264 B2 * | 8/2005 | Petelot | ........................ | 508/318 |
| 7,497,481 B2 * | 3/2009 | Reynolds, Jr. | ............... | 285/333 |
| 2009/0008087 A1 * | 1/2009 | Getman et al. | ........... | 166/242.6 |

FOREIGN PATENT DOCUMENTS

| RU | 2214478 C2 | 10/2003 |
|---|---|---|
| RU | 38498 U1 | 6/2004 |
| RU | 2291904 C1 | 1/2007 |

* cited by examiner

*Primary Examiner*—Aaron M Dunwoody
(74) *Attorney, Agent, or Firm*—Houston Eliseeva LLP

(57) ABSTRACT

The engineering problem of the claimed invention is to enhance wear-resistance of drill pipe tool joints. The proposed drill pipe consists of a body with upset ends and tool joints connected by means of friction welding, having tapered thread and a double coating, the first layer being applied by means of thermo-diffusion zincing and the second one, by means phosphate treatment. Enhancement of tool joint life, as compared to the tool joints with phosphate coating only, allows no overdimension to be stipulated for future repair purposes, which saves up to several kilos of metal per tool joint, decreasing the drill string weight by several tons. With a view to increasing the joints' durability and reliability of welding seams the thickness $\delta$ of the first coating layer as function of thread conicity K is adjusted according to the following formula: $\delta = 0.09 \ldots 0.13$ K. The segment at 15 to 25 mm from the welding spot on joints is coated with phosphate only.

1 Claim, 1 Drawing Sheet

DRILL PIPE WITH TOOL JOINTS

RELATED APPLICATIONS

This application is a Continuation of PCT application serial number PCT/IB/2008/001923 filed on Jul. 14, 2008, which in turn claims priority to Russian Patent Application No. RU 2007127484 filed on Jul. 19, 2007.

FIELD OF THE INVENTION

The invention pertains to drilling equipment, namely drill pipes that are used to drill exploration, oil and gas wells.

BACKGROUND OF THE INVENTION

A drill pipe consists of a pipe itself—a rather long component that is almost untreated mechanically, and of interlocking devices with the threaded connections (further referred to as joints or tool joints). The latter are located at both pipe's ends forming either integral joints or permanent connections. This very device will be further denoted by the term "drill pipe". The term "pipe" will denote a semifinished drill pipe without tool joints.

Tool joints connect pipes into a drill string and represent elements with external tapered thread (referred to as the pipe nipple) or with internal thread (referred to as the tool joint box). As distinct from pipes, tool joints undergo complicated mechanical treatment. Thus it is more economic to produce short joints separately and then weld them to bearing faces. At present, great majority of drill pipes are produced with flash weld tool joints. In order to increase the area of welded connection and decrease tension, pipe ends are made expanded, i.e. upset. Prefabricated joints and pipe ends are joined by means of friction welding (see, for example, Patent of the Russian Federation No. 2291904 acc. to class. C21D 9/08).

Drill pipes outwear in the course of drilling. Certain pipes with flash weld tool joints do not outwear evenly. Endurance capability of the body of a drilling pipe is much higher than that of a weld tool joint. Tool-joint thread wears out much quicker than the pipe body. Therefore, tool joints are designed and fabricated liberal, which allows at least one repair. For repair purposes joints are faced at a height of 20 to 40 mm. Due to the margin, metal consumption is increased, flexural rigidity becomes greater, and the dimensions of tool joints, larger. Revamping of pipes is only possible at pipe yards thus the overall maintenance expenses must include charges for transportation pipes to the yard and back.

At least the thread segments of drill pipes are specially coated. Coating enhances the corrosion stability and wear resistance of pipes and other parts of drilling equipment.

There are, for example, thread connections for oil-well tubing and drill pipes coated with plastic copper-bearing alloy (Patent of the Russian Federation No. 2214478 acc. to class. C23C 26/00). The coating is applied to each reinforced part individually through pressuring the rubbing rod onto the surface of the revolving part, the contact area being simultaneously dampened with a certain liquid. Such a coating enhances corrosion stability and increases resistance to wear of thread connections but the coating process is very complex, which is a shortcoming. Besides, coating parameters differ greatly from part to part since coating is applied to each part individually. Completion of the process is signaled by the appearance of a "harsh whistling sound", which is a very subjective criterion.

In terms of technical essence and efficiency, the nearest to the proposed solution are the drill pipes, coupling boxes and adaptors that have on their thread connections a two-layer protective coating consisting of a zinc layer (10-14 mcm), which is applied by means of thermo-diffusion galvanizing, and an overlay of phosphate coating (2-3 mcm) (Patent of the Russian Federation No. 38498 acc. to class. F16L15/08). The thermal-diffusion galvanization is most suitable for large-scale production and ensures the coating of appropriate quality. The second phosphate layer is applied so as to enhance the reliability of a 15-mcm thermo-diffusion zinc coating whose continuity is not guaranteed. Such a two-layer coating ensures protection of connecting elements from corrosion whether they are stored or transported. However the coating wears out after first making-up/breakout cycles, with maximum of ten cycles, followed by wearing out of metal thread. Therefore, the coating currently in use does not enhance the endurance capability of tool joints.

SUMMARY OF THE INVENTION

The result that is achieved through implementation of the proposed technology consists in the increased durability of tool joints integrated in drill pipes.

This is achieved thank to the following: for a drill pipe whose welded tool joints have tapered thread and double coating, the first layer of which is applied by means of thermo-diffusion and the second one, by means of phosphatization, the thickness of the $1^{st}$ layer $\delta$ measured in $\mu$ (micrometers) is related to the conicity (K) of the thread as follows: $\delta = 0.09 \ldots 0.13$ K, and there is only a phosphate coating in a segment of 15-25 mm from the welding spot.

The effect of the coating that is applied by means of thermo-diffusion powder galvanizing and whose thickness ($\mu$) equals $0.09 \ldots 0.13$ K, where K is the conicity of thread, is as follows: the wear resistance of tool joints, or their durability, increases, as measured by the amount of making-up/breakout cycles.

The phosphate coating increases the corrosion stability of a joint, especially on segments with no zinc coating.

The fact that segments 15 to 25 mm from the welding spot are only coated with phosphate results in greater durability of a drill pipe due to the enhanced reliability of the welded connection between the joint and the pipe body.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
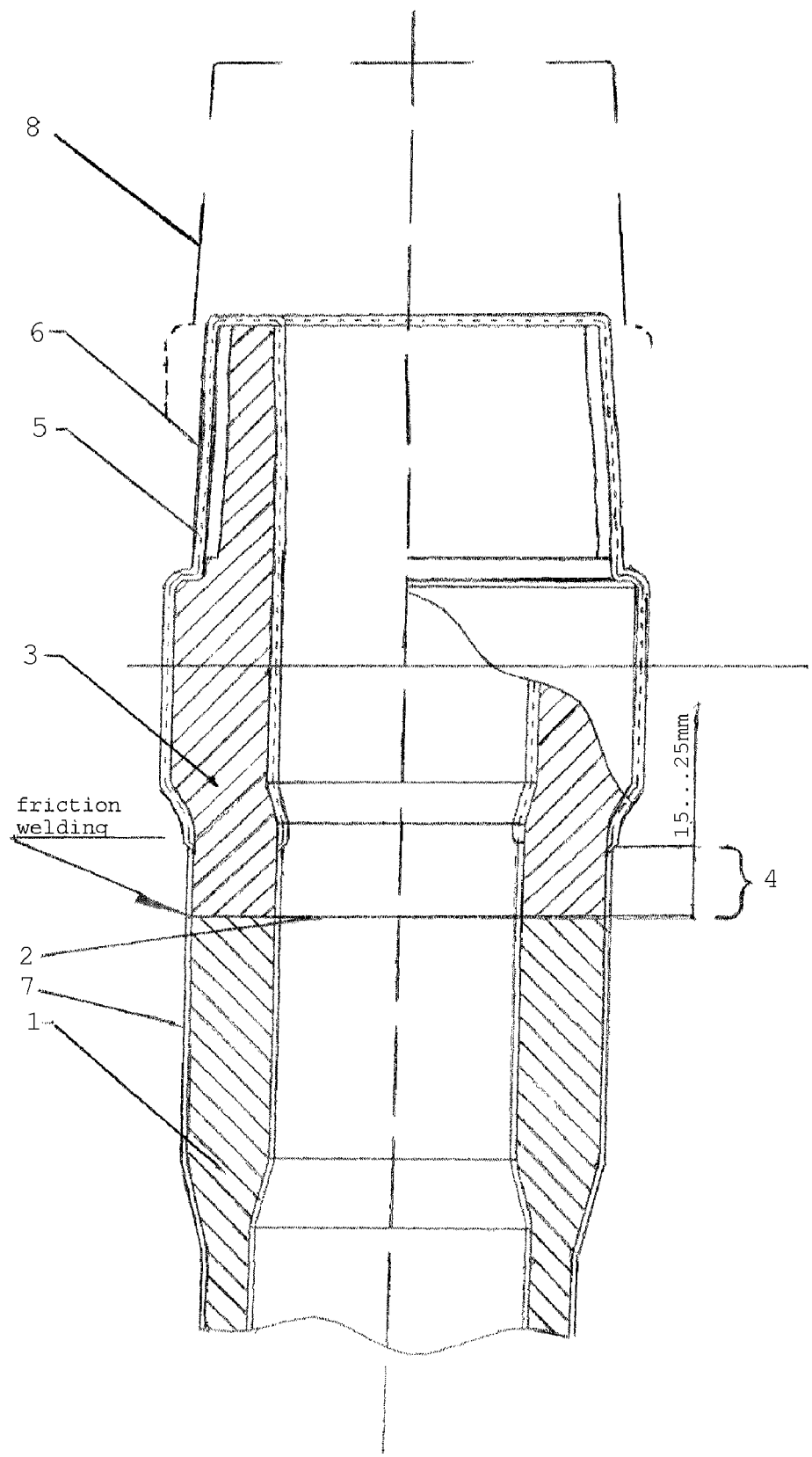
FIG. 1 shows an end of the proposed pipe with a welded tool joint.

A drill pipe consists of the pipe body 1 connected by permanent connection at both ends 2 (welded connection) with connecting joints (tool joints) 3, having either external or internal tapered thread. As an example, FIG. 1 contains Joint 3 with an external thread (pipe nipple). The other pipe end with a joint with an internal thread is not shown in the FIGURE. The relevant specifications of this pipe end are completely analogous.

The whole surface of joints except Segment 4 of 15 to 25 mm long from the welding spot, is treated with Coating 5 and applied by means of thermo-diffusion zincing. The thickness δ of Coating 5 measured in μ (micrometers) is 0.09 to 0.13 K, where K is the conicity of the thread. This correlation is experimentally established for conicity values ranging from ⅙ to ¼, i.e. for most often used values of tool-joint threads.

There is Phosphate Layer 6 over Coating 5. During fabrication of tool joints it is applied on both segment 4 and the frontal segment. The thickness of Phosphate Layer 6 is 1 to 3μ as is usual for phosphatic anticorrosive coatings. The thickness of 2-3 mcm is more preferable.

Dashed line 8 in FIG. 1 shows the dimensions of the tool joint currently in use, for reference purposes.

The fabrication method of the proposed drill pipes is as follows.

First, Pipe Bodies 1 are fabricated in the form of segments with upset ends. Then follows fabrication of Joints Parts 3 treated with Coating 4 by means of thermo-diffusion zincing. The mode of coating process is regulated so as the final thickness of the coating does not breach the above mentioned relationship between the thickness and the conicity value K of Joint 3. Then the zinc coating 4 is removed from the joint butt, meant for welding to Pipe Body 1 and from the adjacent side area of Joint 3, ranging from 15 to 25 mm. After that, the whole surface of Joint 3 is treated with phosphate till Phosphate Layer 6 (1 to 3 mm) is produced.

Then Joint 3 is connected to Pipe Body 1 by means of friction welding. The loss in length is usually from 10 to 15 mm per joint.

Due to the absence of Zinc Coating 4 at the butt and adjacent areas of the joint, none of intermetallic compounds reach the welding area, which preserves its strength characteristics. If Segment 4 of Joint 3, free of zinc coating, is less than 15 mm long, ingress of intermetallic compounds into the welding area may deteriorate the strength characteristics of the weld seam. Increase in the length of the said Segment 4 to more than 25 mm does not make the seam more reliable but widens the area unprotected by the zinc coating 5, which decreases the durability.

Phosphate Coating 6 protects the surfaces from corrosion during the storage periods. There is no need to remove the coating before welding as the coating of the specified thickness does not affect the quality of the welded connection. The coating disappears after the procedures of welding, cleaning, mechanical and thermal treatment of the welding area. The welding spot, as well as the whole pipe, is coated with Layer 7 of protective varnish to prevent corrosion.

If the thickness δ of thermo-diffusion Zinc Layer 4 is less than the least specified value, i.e. if δ(μ)<0.09 K, neither the continuity of the coating nor the proposed enhancement of the efficiency can be guaranteed. If the thickness δ of Layer 4 is more than the highest specified value, i.e. δ(μ)>0.13 K, the incremental size of tightness determined by the type of coating starts to exceed admissible norms, which may lead to rejection of drill pipes immediately on the job site.

The range of thickness values for zinc coating was established in the course of time-consuming and expensive tests for the terminal amount of making-up/breakout cycles with the maximum operational torque. While testing the proposed pipes, it was established that if the above-mentioned relationship between the thickness of coating and the conicity is taken into consideration, the coating is preserved as long as 200 to 300 cycles, whereas the durability of tool joints currently in use does not exceed 10 cycles. The service life of such tool joints, as compared to that of those treated with only phosphate, increases up to 2000-3000 cycles. This approximately equals to the durability level of pipe bodies. Such enhancement of the efficiency saves the trouble of repairs and the necessity therewith of transportation to the pipe yard and back. A wholly and completely worn out drill pipe goes straight to the waste metal site.

Moreover, such enhancement of the pipe life allows no overdimension of joint parts to be stipulated with a view to future repairs (compare the dimensions of the proposed tool joint with those of the tool joint currently in use, shown with dashed line 8, FIG. 1), which saves up to several kilos of metal per tool joint, decreasing the drill string weight by several tons. Decrease in the dimensions of a tool joint achieved by excluding metal for reserve purposes decreases the drill string's flexural rigidity and increases its mobility in curvilinear well sites as well as provides better conditions for "kickoffs" of second bore holes during well-workover operation.

While this invention has been particularly shown and described with references to preferred embodiments thereof, it will be understood by those skilled in the art that various changes in form and details may be made therein without departing from the scope of the invention encompassed by the appended claims.

What is claimed is:

1. A drill pipe comprising:
   a drill pipe body and
   tool joints with conical threading, the tool joints being engaged at their butts with respective ends of the drill pipe body;
   wherein the tool joints comprise a double-layered coating, the first layer being zinc, being applied by means of thermo-diffusion zincing and the second layer being phosphate, being applied by means of phosphate treatment;
   wherein the butts of the tool joints and adjacent areas within 15 to 25 mm include only the coating applied by means of phosphate treatment; and
   wherein a thickness δ, measured in micrometers, of the first coating layer is selected from an interval of 0.09 K to 0.13 K, wherein K is the conicity of the threading.

* * * * *